US011530750B2

(12) United States Patent
Gillispie et al.

(10) Patent No.: US 11,530,750 B2
(45) Date of Patent: Dec. 20, 2022

(54) HORIZONTAL BALANCED GUIDED VALVE

(71) Applicant: Halliburton Energy Services, Inc., Houston, TX (US)

(72) Inventors: Aric Martin Gillispie, Duncan, OK (US); James Alan Olis, Duncan, OK (US); David Mark Stribling, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 301 days.

(21) Appl. No.: 16/810,578

(22) Filed: Mar. 5, 2020

(65) Prior Publication Data

US 2021/0190211 A1 Jun. 24, 2021

Related U.S. Application Data

(60) Provisional application No. 62/953,411, filed on Dec. 24, 2019.

(51) Int. Cl.
*F16K 1/30* (2006.01)
*F16K 1/42* (2006.01)
*F16K 1/36* (2006.01)
*F04B 53/10* (2006.01)
*E21B 43/26* (2006.01)

(52) U.S. Cl.
CPC .......... *F16K 1/304* (2013.01); *E21B 43/2607* (2020.05); *F04B 53/10* (2013.01); *F16K 1/36* (2013.01); *F16K 1/42* (2013.01); *E21B 43/26* (2013.01); *F04B 53/1022* (2013.01)

(58) Field of Classification Search
CPC ... F16K 1/304; F16K 1/36; F16K 1/42; E21B 43/2607; E21B 43/26; F04B 53/10; F04B 53/1022; F04B 15/02
See application file for complete search history.

(56) References Cited

U.S. PATENT DOCUMENTS

| | | | |
|---|---|---|---|
| 1,662,725 A | 3/1928 | Toney, Jr. | |
| 2,673,519 A | 3/1954 | Halliburton | |
| 2,678,006 A | 5/1954 | Gray | |
| 3,005,412 A | 10/1961 | Camp | |

(Continued)

FOREIGN PATENT DOCUMENTS

| | | |
|---|---|---|
| CH | 257522 A | 10/1948 |
| CN | 104695901 A | 6/2015 |

(Continued)

OTHER PUBLICATIONS

Gillispie, Aric Martin et al.. Filing Receipt, Specification and Drawings for U.S. Appl. No. 62/953,411, filed Dec. 24, 2019, titled Horizontal Balanced Guide Valve, 14 pages.

(Continued)

*Primary Examiner* — James G Sayre
(74) *Attorney, Agent, or Firm* — Conley Rose, P.C.; Rodney B. Carroll

(57) ABSTRACT

A valve assembly comprising a valve guide and one or more weights coupled to and/or integral with the valve guide. The valve assembly may further comprising a valve body and a valve stem connecting the valve body to the valve guide. The valve assembly may be disposed in a fluid end of a positive displacement pump that is operated to flow a wellbore servicing fluid into a wellbore.

17 Claims, 10 Drawing Sheets

(56) References Cited

U.S. PATENT DOCUMENTS

| | | | |
|---|---|---|---|
| 3,229,640 | A | 1/1966 | Williams |
| 3,301,197 | A | 1/1967 | Dodson et al. |
| 3,380,247 | A | 4/1968 | Colmerauer |
| 3,887,305 | A | 6/1975 | Ito |
| 4,478,561 | A | 10/1984 | Elliston |
| 5,061,159 | A | 10/1991 | Pryor |
| 6,497,291 | B1 | 12/2002 | Szarka |
| 8,360,751 | B2 | 1/2013 | Duncan |
| 8,590,614 | B2 | 11/2013 | Surjaatmadja et al. |
| 2009/0246051 | A1 | 10/2009 | Kim |
| 2012/0141308 | A1* | 6/2012 | Saini .................. F04B 53/1025 977/773 |
| 2012/0279721 | A1 | 11/2012 | Surjaatmadja et al. |
| 2014/0127036 | A1 | 5/2014 | Buckley et al. |
| 2014/0127058 | A1 | 5/2014 | Buckley et al. |
| 2014/0127062 | A1 | 5/2014 | Buckley et al. |
| 2014/0322050 | A1 | 10/2014 | Marette et al. |
| 2016/0131131 | A1 | 5/2016 | Weaver et al. |
| 2016/0281699 | A1 | 9/2016 | Gnessin et al. |
| 2016/0319805 | A1 | 11/2016 | Dille |
| 2019/0145391 | A1 | 5/2019 | Davids |
| 2020/0347706 | A1 | 11/2020 | Nowell et al. |

FOREIGN PATENT DOCUMENTS

| | | | | |
|---|---|---|---|---|
| CN | 209212539 | U | * 8/2019 | ............ F16K 1/304 |
| CN | 209212539 | U | 8/2019 | |
| DE | 19808724 | A1 | 9/1998 | |
| EP | 0580196 | A1 | 1/1994 | |
| EP | 1103722 | A2 | 5/2001 | |
| EP | 2383470 | A1 | 11/2011 | |
| GB | 120622 | A | 11/1918 | |
| GB | 450645 | A | 7/1936 | |
| GB | 672173 | A | 5/1952 | |
| GB | 1226014 | A | 3/1971 | |
| GB | 1262826 | A | 2/1972 | |
| JP | 63001012 | Y2 | 1/1988 | |
| JP | 2002037217 | A | 2/2002 | |
| JP | 2004257283 | A | 9/2004 | |
| JP | 4121804 | B2 | 7/2008 | |
| JP | 2009131747 | A | 6/2009 | |
| JP | 5107651 | B2 | 12/2012 | |
| JP | 2020040010 | A | 3/2020 | |
| WO | 2007091055 | A1 | 8/2007 | |

OTHER PUBLICATIONS

Foreign Communication from Related Application—International Search Report and Written Opinion of the International Searching Authority, International Application No. PCT/US2020/024293, dated Sep. 17, 2020, 13 pages.

Foreign Communication from Related Application—International Search Report and Written Opinion of the International Searching Authority, International Application No. PCT/US2020/022043, dated Jul. 3, 2020, 13 pages.

Kiani, Mahdi et al., "Numerical Modeling and Analytical Investigation of Autofrettage Process on the Fluid End Module of Fracture Pumps," Journal of Pressure Vessel Technology, Aug. 2018, pp. 041403-1–041403-7, vol. 140, ASME.

"Pump Catalog," Cat Pumps, Inc., 2014, 24 pages.

Furuta, Katsunori et al.,"Study of the In-Line Pump System for Diesel Engines to Meet Future Emission Regulations," SAE International Congress and Exposition, Feb. 1998, pp. 125-136, Society of Automotive Engineers, Inc.

"550 Series: High Pressure, High Flow Water Jetting," Gardner Denver Water Jetting Systems, Inc., 2009, 4 pages.

Houghton, J.E. et al., "Improved Pump Run Time Using Snow Auto-Rotating Plunger (SARP) Pump," SPE Western Regional Meeting, May 1998, SPE46217, 6 pages, Society of Petroleum Engineers, Inc.

"Improved Double Acting Pump, Scientific American," 1867, pp. 248, vol. 17, No. 16, American Periodicals.

Langewis, Jr., C. et al., "Practical Hydraulics of Positive Displacement Pumps for High-Pressure Waterflood Installations," Journal of Petroleum Technology, Feb. 1971, pp. 173-179, SPE-AIME/ Continental Oil Co.

Petzold, Martin et al., "Visualization and Analysis of the Multiphase Flow in an Electromagnetically Driven Dosing Pump," ASME/ BATH Symposium on Fluid Power & Motion Control, Oct. 2013, FPMC2013-4433, 6 pages, ASME.

Romer, M. C. et al., "Field Trial of a Novel Self-Reciprocating Hydraulic Pump for Deliquification," SPE Production & Operations, 2017, 12 pages, Society of Petroleum Engineers.

* cited by examiner

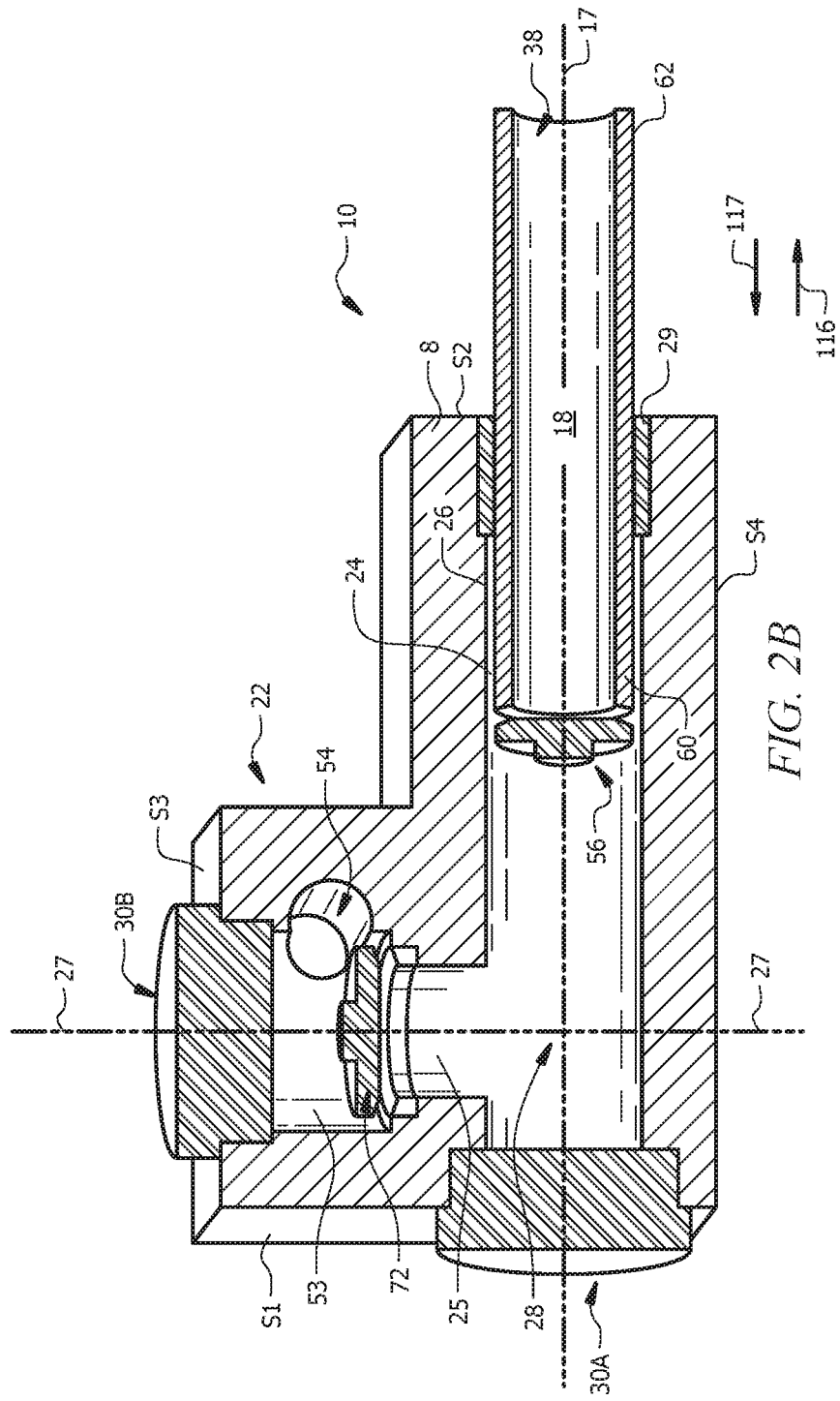

HORIZONTAL BALANCED GUIDED VALVE

CROSS-REFERENCE TO RELATED APPLICATIONS

This application claims priority to U.S. Provisional Patent Application No. 62/953,411, filed on Dec. 24, 2019, and titled "Horizontal Balanced Guided Valve," the entirety of which is hereby incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to valves, for example valves contained in pumps that are used to pump a wellbore servicing fluid. More particularly, the present disclosure relates to valves used in reciprocating devices for pumping fluids into a wellbore and methods of using same.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern life and reliability of pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a valve assembly that enhances life and reliability of a reciprocating pump comprising same.

BRIEF SUMMARY OF THE DRAWINGS

For a more complete understanding of this disclosure, reference is now made to the following brief description, taken in connection with the accompanying drawings and detailed description, wherein like reference numerals represent like parts.

FIG. 2B is a cut-away illustration of an exemplary reciprocating pump comprising a cross-bore (e.g., a tee-bore ("T-bore")) pump fluid end.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In plunger or piston pumps using horizontally oriented valves, such as in concentric pumps, certain designs can require the use of valves having guides on one side of the sealing surface, and such valves can be referred to as horizontal guided valves or horizontal guided valve assemblies. The design of the presently disclosed horizontal guided valve moves the center of gravity by adding additional weight and/or removing a portion of mass to shift the center of gravity of the horizontal guided valve back toward the sealing or guiding surface. This will allow the horizontal guided valve to seal in a centered position. By moving the center of gravity of the horizontal guided valve (for example to a guiding surface), upon opening and closing, the center axis of the horizontal guided valve will remain parallel to the flow path which allows for uniform loading of the valve stem.

Disclosed herein is a reciprocating apparatus for pumping pressurized fluid. In embodiments, the reciprocating apparatus comprises a horizontal valve assembly comprising a valve guide, a valve body, and a valve stem connecting the valve body to the valve guide, wherein the valve assembly has a center of gravity outside the valve body. In embodiments, the center of gravity can be in the valve stem or valve guide.

Figure 1:
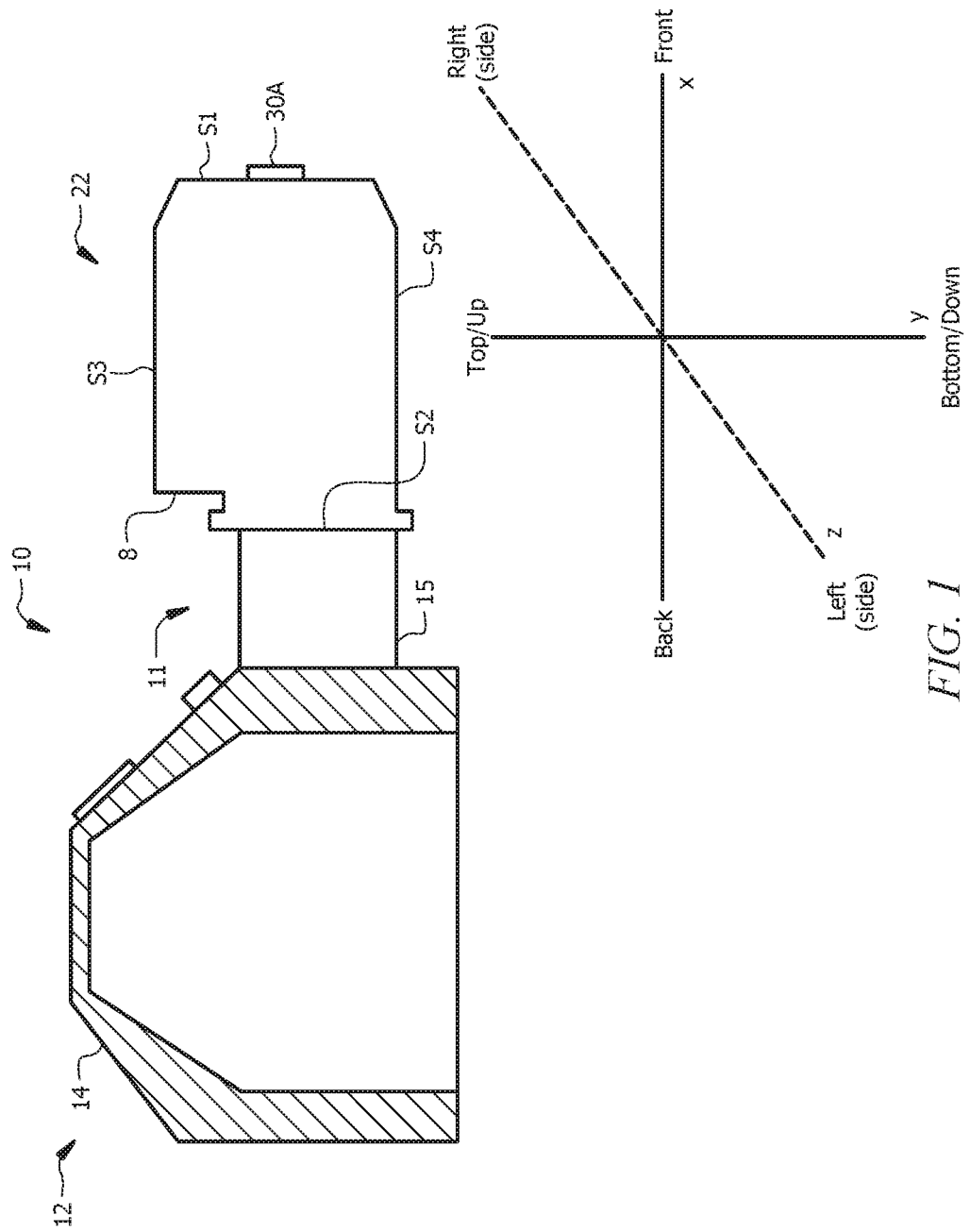
FIG. 1 is an elevational view of a reciprocating pump.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the x-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2A:
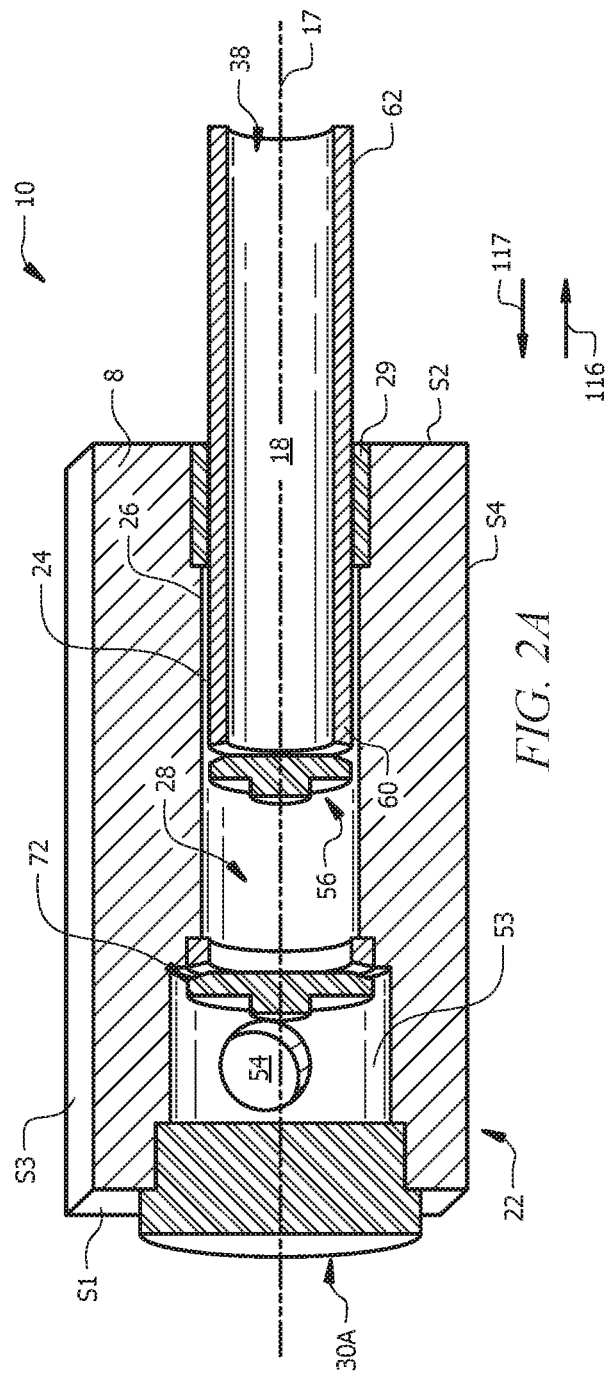
FIG. 2A is a cut-away illustration of an exemplary reciprocating pump comprising a concentric bore pump fluid end.

The pump fluid end 22 is integrated with the pump power end 12 via the integration section 11, such that pump power end 12 is operable to reciprocate the reciprocating element 18 within a reciprocating element bore 24 (FIG. 2A/FIG. 2B) of the pump fluid end 22. The reciprocating element bore 24 is at least partially defined by a cylinder wall 26. As described further hereinbelow with reference to FIG. 2A, pump fluid end 22 of this disclosure can be an in-line or "concentric" bore pump fluid end. In alternative embodiments, described further hereinbelow with reference to FIG. 2B, pump fluid end 22 is a "cross-bore" pump fluid end 22 (also referred to herein as a multi-bore pump fluid end), which, as utilized herein, can include "T-bore" pump fluid ends. FIG. 2A is a schematic showing a concentric bore pump fluid end 22 engaged with a reciprocating element 18. FIG. 2B is a schematic showing a tee-bore pump fluid end 22 engaged with a reciprocating element 18. In a tee-bore pump fluid end 22, reciprocating element bore 24 and tee-bore 25 are perpendicular, making the shape of a "T". As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 3:
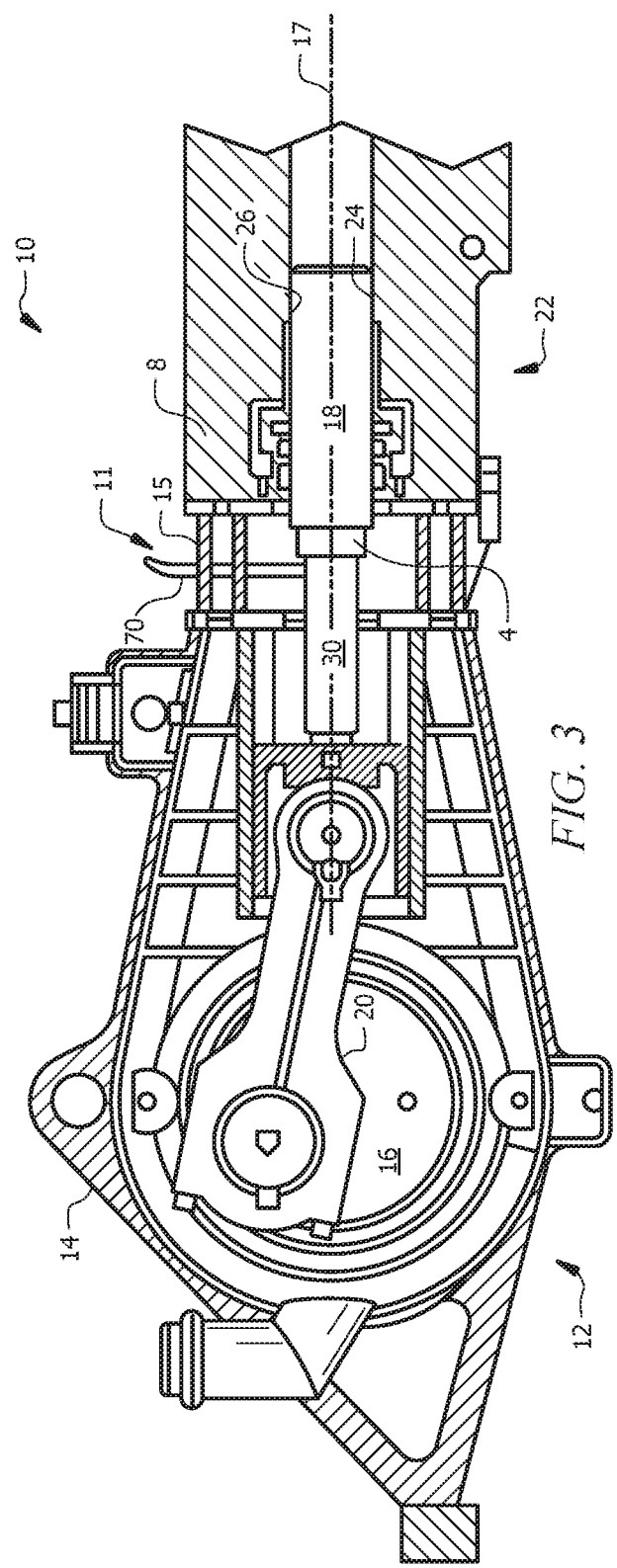
FIG. 3 is cut-away illustration of a pump power end of a pump.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 3 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm 20 and pushrod 30. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIG. 2A and FIG. 2B. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1 and indicated by arrow 117 of FIG. 2A and FIG. 2B) and return strokes (also referred to as suction strokes and correlating to movement in a negative direction parallel to the x-axis of FIG. 1 and indicated by arrow 116 in FIG. 2A and FIG. 2B), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. When discharge valve assembly 72 is in a closed configuration (e.g., under the influence of a closing mechanism, such as a spring, the high pressure in a discharge pipe or manifold containing discharge outlet 54) prevents fluid flow into discharge chamber 53 and causes pressure in the pump chamber 28 to accumulate upon stroking of the reciprocating element 18. When the reciprocating element 18 begins the forward or discharge stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a valve seat thereof) and a configuration in which fluid cannot flow through the valve assembly (e.g., cannot pass between a valve body (e.g., a movable poppet) and a valve seat thereof). As the reciprocating element 18 extends forward, fluid within the pump chamber 28 is discharged through the discharge outlet 54.

During a return or suction stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2A, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric configuration of FIG. 2A, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72).

Suction valve assembly 56 and discharge valve assembly 72 are operable to direct fluid flow within the pump 10. In pump fluid end 22 designs of this disclosure, fluid flows within a hollow reciprocating element (e.g., a hollow plunger) 18 via fluid inlet 38 located toward tail end 62 of reciprocating element 18. The reciprocating element bore 24 of such a fluid end design can be defined by a high pressure cylinder or cylinder wall 26 providing a high pressure chamber. (As utilized here, "high pressure" indicates possible subjection to high pressure during discharge.) When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a pump fluid end 22 design of this disclosure, the fluid inlet 38 is configured to introduce fluid into pump chamber 28 via a reciprocating element 18 that is hollow. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. With reference to the concentric fluid end body 8 embodiment of FIG. 2A, a front access port 30A can be located on a front S1 of the pump fluid end 22 opposite a back S2 of the pump fluid end 22, wherein the back S2 of the pump fluid end is proximal the pump power end 12, upon integration therewith via integration section 11. With reference to the T-bore fluid end body 8 embodiment of FIG. 2B, a front access port 30A can be located on a front S1 of the pump fluid end 22 opposite a back S2 of the pump fluid end 22, wherein the back S2 of the pump fluid end is proximal the pump power end 12, upon integration therewith via integration section 11, and a top access port 30B can be located on a top S3 of the pump fluid end 22 opposite a bottom S4 of pump fluid end 22. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port. In embodiments, the at least one access port is located on a side of the discharge valve assembly 72 opposite the suction valve assembly 56. For example, in the concentric bore pump fluid end 22 embodiment of FIG. 2A, front access port 30A is located on a side (e.g., front side) of discharge valve assembly 72 opposite suction valve assembly 56. In the T-bore pump fluid end 22 embodiment of FIG. 2B, front access port 30A is located on top S3 of pump fluid end 22.

In embodiments, one or more seals 29 (e.g., "o-ring" seals, packing seals, or the like), also referred to herein as 'primary' reciprocating element packing 29 (or simply "packing 29") may be arranged around the reciprocating element 18 to provide sealing between the outer walls of the reciprocating element 18 and the inner walls 26 defining at least a portion of the reciprocating element bore 24. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24 (optionally within a sleeve as described herein). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("oversleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 3; e.g., clamps, adapters, extensions, etc.) may be used to couple the reciprocating element 18 to the pump power end 12 (e.g., to a pushrod 30).

In some embodiments (e.g., T-bore pump fluid end 22 embodiments such as FIG. 2B), the reciprocating element 18 may be substantially solid and/or impermeable (e.g., not hollow). In some embodiments, reciprocating element 18 employed in a concentric bore pump fluid end 22 embodiment (such as depicted in FIG. 2A) or a cross-bore pump fluid end 22 (such as depicted in FIG. 2B) comprises a peripheral wall defining a hollow body. Additionally (e.g., concentric bore pump fluid end 22 embodiments such as FIG. 2A), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 2A, the reciprocating element 18 can contain or at least partially contain the suction valve assembly 56. In embodiments, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within reciprocating element bore 24 and at least partially within reciprocating element 18 in concentric bore pump fluid end 22 designs such as FIG. 2A or T-bore pump fluid end 22 designs such as FIG. 2B, such that a suction valve body of the suction valve assembly 56 moves away from a suction valve seat within the a suction valve seat housing of reciprocating element 18 when the suction valve assembly 56 is opening and toward the suction valve seat when the suction valve assembly 56 is closing.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed proximal the front S1 of bore 24 (e.g., at least partially within discharge chamber 53 and/or pump chamber 28) of the pump fluid end 22, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, in concentric bore pump fluid end 22 configurations such as FIG. 2A, the discharge valve assembly 72 may be coaxially aligned with the suction valve assembly 56 (e.g., along central axis 17), and the suction valve assembly 56 and the discharge valve assembly 72 may be coaxially aligned with the reciprocating element 18 (e.g., along central axis 17). In alternative embodiments, such as the T-bore pump fluid end 22 embodiment of FIG. 2B, discharge valve assembly 72 can be positioned within T-bore 25, at least partially within discharge chamber 53 and/or pump chamber 28, and have a central axis coincident (e.g., coaxial) with central axis 27 of T-bore 25.

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In embodiments, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 at the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2A and 2B) forward in its cylinder. A top dead center position corresponds to the position of a fully extended reciprocating element at zero velocity, e.g., just prior to a reciprocating element moving backward (i.e., in a direction indicated by arrow 116 in FIGS. 2A and 2B) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 4:
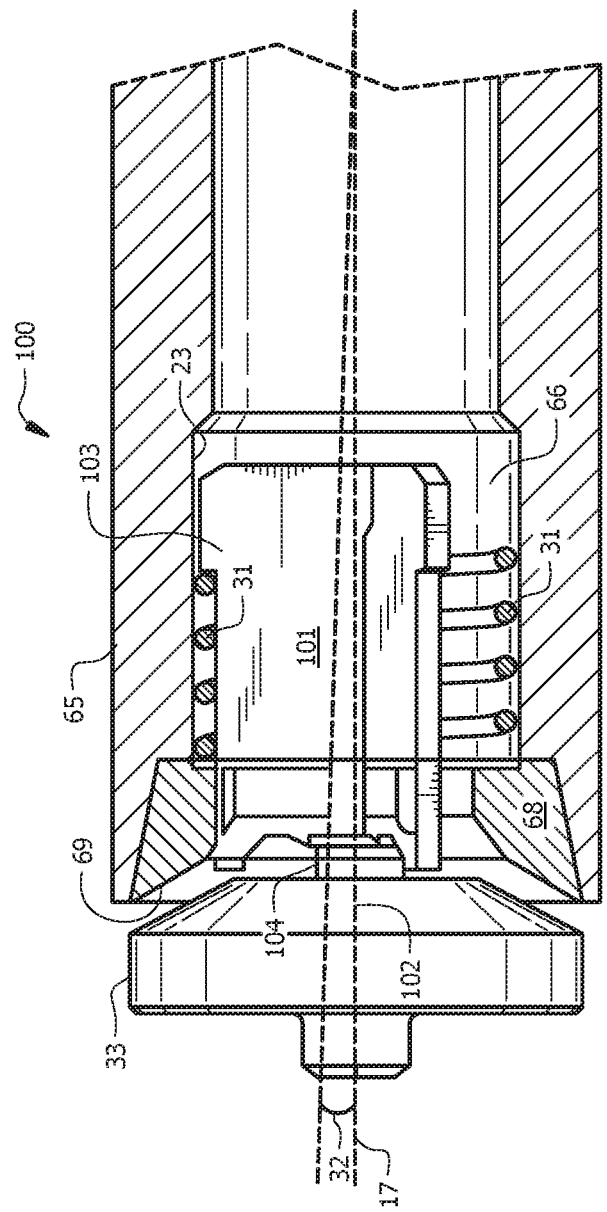
FIG. 4 is a schematic of a horizontal valve assembly 100.
Figure 5A:
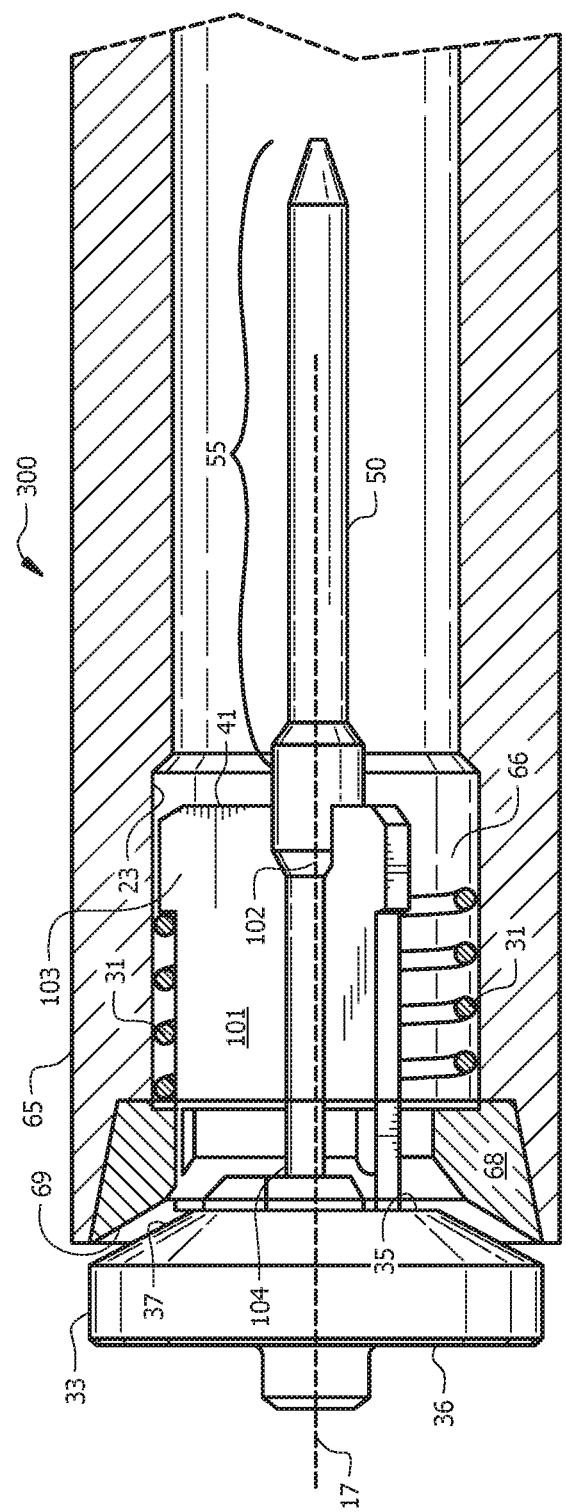
FIG. 5A is a schematic of a horizontal valve assembly 300.
Figure 5B:
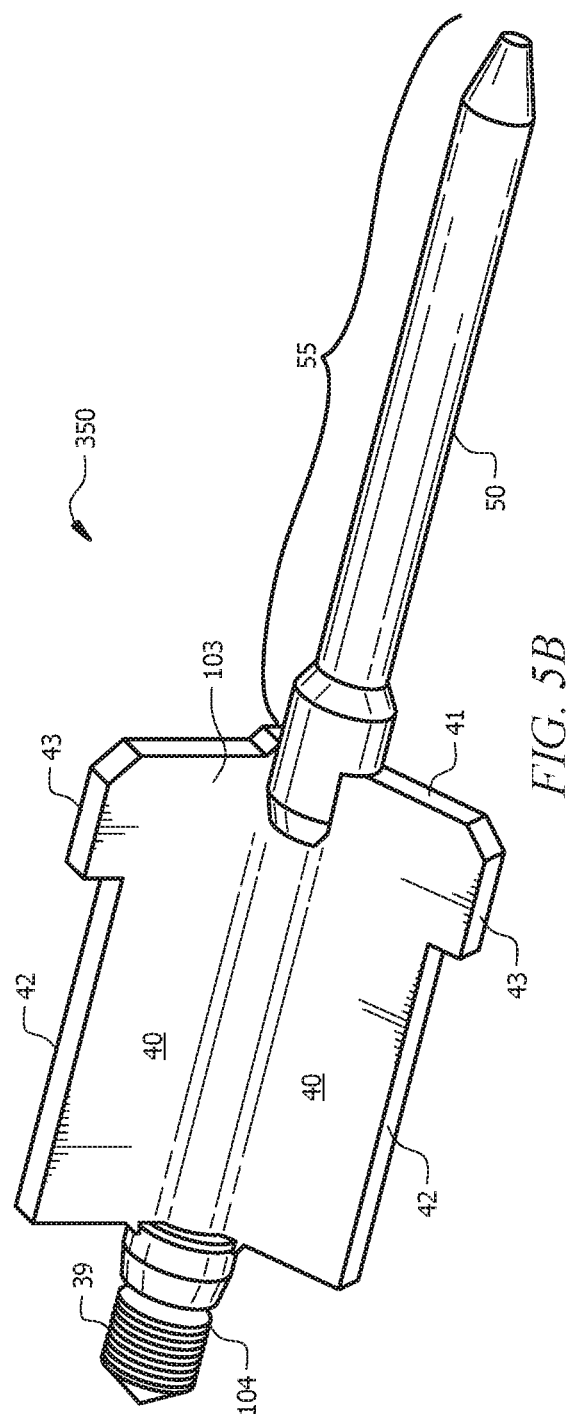
FIG. 5B is a schematic of a weighted valve guide 350 that is included in the horizontal valve assembly 300 of FIG. 5A.
Figure 6:
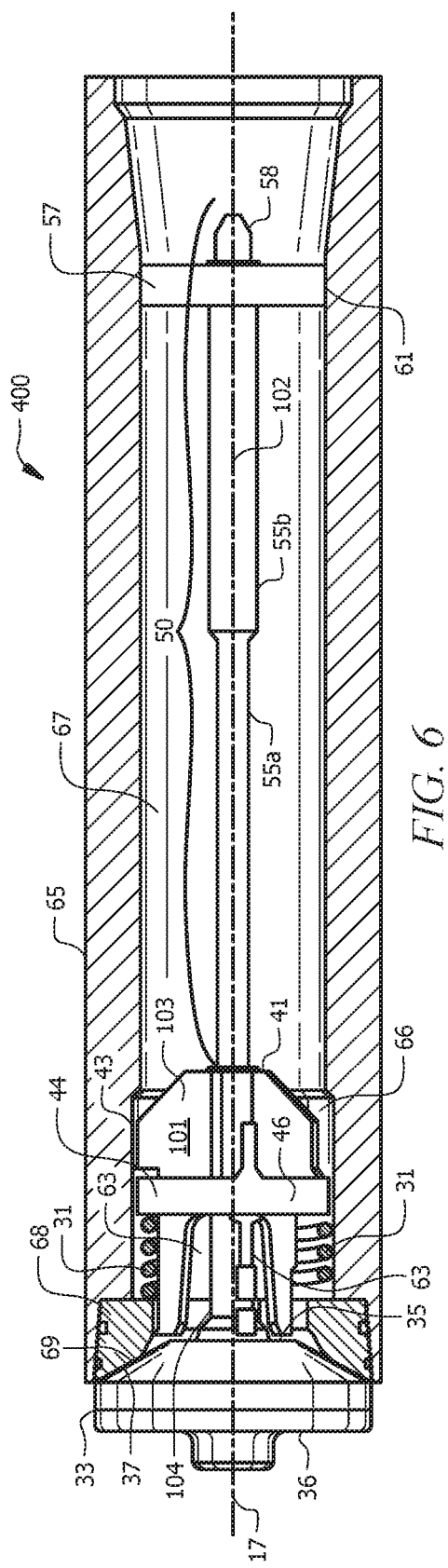
FIG. 6 is a schematic of a horizontal valve assembly 400.
Figure 7:
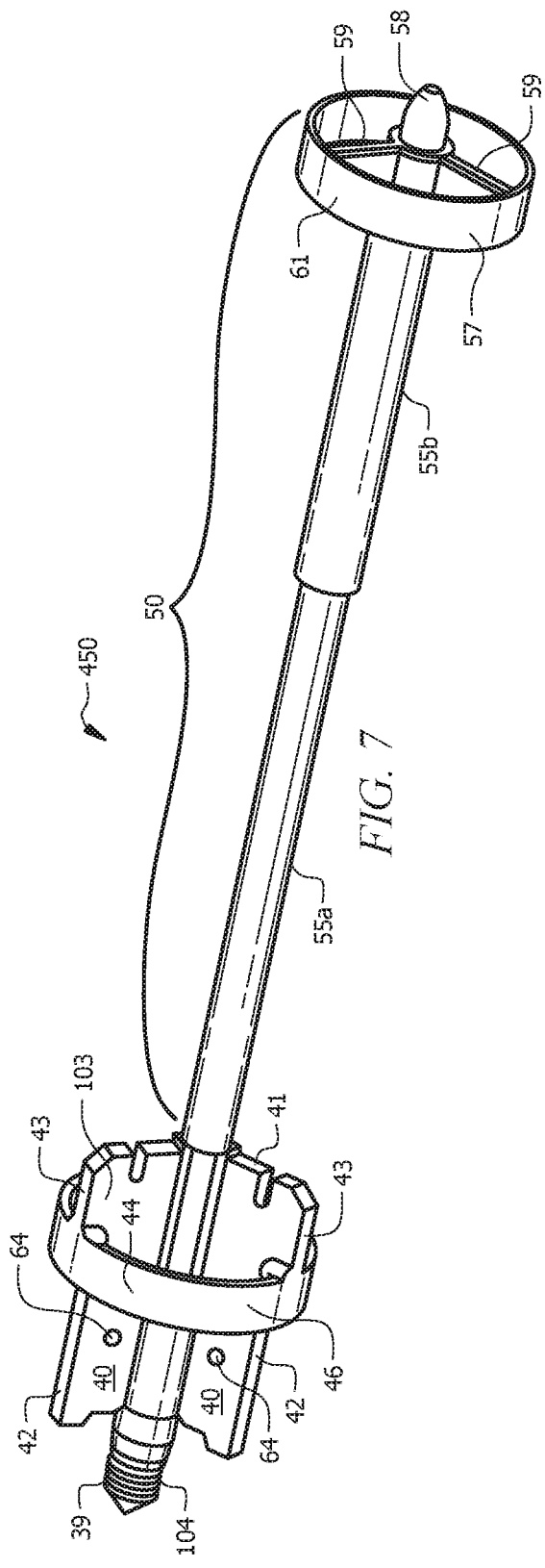
FIG. 7 is a schematic of a weighted valve guide 450 that is included in the horizontal valve assembly 400 of FIG. 6.

According to this disclosure, and as described further herein, a horizontal valve assembly comprises a valve guide, a valve body, and a valve stem connecting the valve body to the valve guide, wherein the valve assembly has a center of gravity outside the valve body. The horizontal valve assembly can have a center of gravity located in the valve stem, the valve guide, or in a weight coupled to and/or integral with the valve guide. FIG. 4 is a schematic of a horizontal valve assembly 100 having a center of gravity inside the valve body, in an open configuration. FIG. 5A is a schematic of horizontal valve assembly 300, in an open configuration, according to an embodiment of the present disclosure, wherein the valve guide is coupled to and/or integral with one or more weights. FIG. 5B is a schematic of a weighted valve guide 350 according to an embodiment of the present disclosure, wherein the valve guide is coupled to and/or integral with one or more weights. FIG. 6 is a schematic of a horizontal valve assembly 400 in a closed position, according to another embodiment of the present disclosure, wherein the valve guide is coupled to and/or integral with one or more weights and a wheel portion (e.g., a second valve guide, also referred to as a guide wheel). FIG. 7 is a schematic of a weighted valve guide 450 according to another embodiment of the present disclosure, wherein the valve guide is coupled to and/or integral with one or more weights and a wheel portion (e.g., a second valve guide, also referred to as a guide wheel).

Referring to FIG. 4, a horizontal valve assembly 100 comprises a horizontal guided valve 101 disposed within a housing 65 having a valve seat 68 and a valve body contact surface 69. The valve seat 68 and valve body contact surface 69 may be an insert placed within the housing 65 or may be integral with (e.g., formed from, for example via machining) the housing 65. The guided valve 101 comprises a valve body 33, a valve guide 103, and a valve stem 104 connecting the valve body 33 to the valve guide 103. A valve spring 31 can be present in a bore 66 of the housing 65. The valve assembly 100 has a horizontal central axis 17. The guided valve 101 has a center of gravity 102 that is located within the valve body 33, which in some instances (e.g., on a suction and/or discharge stroke of a pump comprising the valve assembly 100) may result in the center of gravity 102 being located outside of the valve seat 68 and/or valve body contact surface 69. In such a case it may be difficult to guide the valve 101 on the suction and discharge strokes of the pump. On the suction stroke the valve 101 will move to the open position rapidly, and return rapidly to the closed position on the discharge stroke. The valve 101 will experience very high forces under the pressure sealing and the rapid motion of the valve 101. When a valve is not properly balanced on the guiding surface 23, the valve 101 will tilt upon opening as shown in FIG. 4 (e.g., the valve 101 is in the open configuration as the valve body 33 is not in contact with the valve body contact surface 69). Due to the speed at which a valve 101 returns during pressure sealing, it may not have adequate time to re-center causing the valve 101 to load at an angle 32 relative to the central axis 17. This undesirable angular loading can cause damage to the horizontal valve assembly 100 such as, for example, causing the valve stem 104 to shear or fatigue and fail.

As shown in FIG. 5A, the horizontal valve assembly 300 comprises a horizontal guided valve 101 disposed within a housing 65 having a valve seat 68 and a valve body contact surface 69. The valve seat 68 and valve body contact surface 69 may be an insert placed within the housing 65 or may be integral with (e.g., formed from, for example via machining) the housing 65. The horizontal guided valve 101 comprises a valve body 33, a valve guide 103, and a valve stem 104 connecting the valve body 33 to the valve guide 103. A valve spring 31 (e.g., a compression coil spring) can be present in a bore 66 of the housing 65. The valve assembly 300 has a horizontal central axis 17. In a normally (e.g., biased) closed position, a valve body contact surface 69 of valve seat 68 contacts a valve seat contact surface 37 of valve body 33, preventing or minimizing fluid flow through valve assembly 300. As seen in FIG. 5A, in an open configuration, valve body contact surface 69 of valve seat 68 does not contact valve seat contact surface 37 of valve body 33, thus allowing fluid flow through valve assembly 300.

As shown in FIG. 5B, a weighted valve guide 350 comprises the valve guide 103 and one or more weights 50 (alternatively referred to as a counterweight or a balancing weight). The weight 50 can be added to (e.g., coupled to, affixed to for example via welding or threaded connection) the valve guide 103 and/or can be integral with the valve guide 103 (e.g., formed as part of a machining or casting process to produce valve guide 103 and weight 50 together as an integrated, monolithic, unitary component or body). The weight 50 can be any suitable size or shape, for example a rod portion 55 coupled to and extending about coaxially with central axis 17 from the end 41 of valve guide 103. The weight 50 (e.g., rod portion 55) may be any suitable length, thickness, cross-section, etc. to provide a sufficient mass to move the center of gravity 102 a distance (e.g., about 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10 or more inches) along the horizontal central axis 17 in a direction away from (distal from) the valve body 33 and toward the end 41 of valve guide 103. For example, the center of gravity 102 may be moved a distance along the horizontal central axis 17 in a direction away from the valve body 33 and toward the end 41 of valve guide 103 sufficient to position the center of gravity 102 inside of the valve body contact surface 69, the valve seat 68, and/or within a portion of the housing 65 having valve guide 103 disposed therein (e.g., within a bore 66 of housing 65). In embodiments, the weight 50 can be added to horizontal guided valve 101 to strategically position the center of gravity in an optimal location for uniform sealing and loading of the valve body 33 with the valve body contact surface 69. The weight 50 may serve to guide, center, and/or balance the guided valve 101 within the housing 65 (e.g., along or relative to central axis 17 and with the valve guide 103 in contact with guiding surface 23 of bore 66).

The weight 50 can include one or more weights, for example 1, 2, 3, 4, 5, 6, 7, 8, 9, 10 or more weights. The one or more weights can have any suitable size, shape, length, thickness, and cross-section effective to position a center of gravity of the valve assembly outside the valve body 33. In an embodiment, the valve assembly comprises two weights, and a center of gravity 102 of the valve assembly is located between the two weights.

As shown in FIGS. 5A and 5B, the weight 50 can be a rod portion 55 coupled to and extending about coaxially with central axis 17 from the end 41 of valve guide 103, wherein the rod portion 55 has (A) an about oval or circular cross section having a diameter in a range of from about 0.25 to about 1.5 inch, alternatively in a range of from about 0.25 to about 1.25 inch, alternatively in a range of from about 0.25 to about 1.0 inch, alternatively in a range of from about 0.25 to about 0.75 inch, alternatively in a range of from about 0.3 to about 0.7 inch, alternatively in a range of from about 0.4 to about 0.6 inch, or alternatively about 0.5 inch; (B) an axial length (measured a distance along central axis 17 from end 41 of valve guide 103) of equal to greater than about 1, 2, 3, 4, 5, 6, 7, 8, 9, 10, 11, or 12 inches; (C) a mass of equal to or greater than 10, 20, 30, 40, 50, 60, 70, 80, 90, 100, 125, 150, 175, 200, 225, 250, 275, 300, 325, 350, 375, 400, 425, 450, 475, 500, 600, 700, 800, 900, 1000, 1100, 1200, 1300, 1400, 1500, 1600, 1700, 1800, 1900, 2000, 2100, 2200, 2300, 2400, or 2500 grams; or (D) any combination of (A), (B), and (C).

As shown in FIG. 5B, the valve guide 103 further comprises a coupler 39. Valve guide 103 can be coupled to or decoupled from the first side 35 of the valve body 33 via the coupler 39. For example, coupler 39 comprises a threaded portion of the valve stem 104, which engages complimentary threads located in a threaded hole or recess located on the first side 35 of the valve body 33. Valve guide 103 comprises a plurality of wings or fins 40, for example and without limitation three wings 40, spaced at 120 degrees to form a 360 degree circumference. Each wing 40 may further comprise a recessed or notched portion 42 and a contact portion 43. The notched portion 42 extends a radial distance from central axis 17 less than the radial distance from the central axis 17 to the inside, guiding surface 23 of bore 66 such that a recess is provided to receive the valve spring 31. The contact portion 43 extends a radial distance from central axis 17 about equal to the radial distance from the central axis 17 to the inside, guiding surface 23 of bore 66 such that the contact portion 43 centralizes the valve guide 103 within the bore 66. All or a portion of each contact portion 43 of each wing 40 may be coupled together via a circumferential guide ring or wheel 44, as shown in FIGS. 6 and 7 (also referred to as a first guide ring or wheel coupled to the valve guide 103). Similar to contact portion 43, an outer surface 46 of guide ring 44 extends circumferentially a radial distance from central axis 17 about equal to the radial distance from the central axis 17 to the inside, guiding surface 23 of bore 66 such that the outer surface 46 further aids in the centralization of the valve guide 103 within the bore 66.

As shown in FIG. 5A, the horizontal guided valve 101 (comprising weighted valve guide 350 of FIG. 5B) has a center of gravity 102 outside the valve body 33. Compared to the horizontal guided valve 101 in the valve assembly 100 in FIG. 4, which has a center of gravity inside the valve body, the horizontal guided valve 101 of FIG. 5A is designed with the weight 50 placed to move the center of gravity 102 to outside the valve body 33. In embodiments such as shown in FIG. 5A, the center of gravity 102 can be in the guiding portion of the horizontal guided valve 101 (e.g., the center of gravity 102 is now located within valve guide 103). The center of gravity 102 can be located proximate an end of the valve guide 103 opposite from (distal from) the valve body 33. In an embodiment such as shown in FIG. 5A, the center of gravity can located within the valve guide 103 at a distance along the central axis 17 equal to or less than about 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5 inches from the end 41 of the valve guide 103 that is opposite from (distal from) the valve body 33.

As shown in FIG. 6, the horizontal valve assembly 400 comprises a horizontal guided valve 101 disposed within a housing 65 having a valve seat 68 and a valve body contact surface 69. The valve seat 68 and valve body contact surface 69 may be an insert placed within the housing 65 or may be integral with (e.g., formed from, for example via machining) the housing 65. The horizontal guided valve 101 comprises a valve body 33, a valve guide 103, and a valve stem 104 connecting the valve body 33 to the valve guide 103. A valve spring 31 (e.g., a compression coil spring) can be present in a bore 66 of the housing 65. The valve assembly 400 has a horizontal central axis 17. In a normally (e.g., biased) closed position as shown in FIG. 6, valve body contact surface 69 of valve seat 68 contacts a valve seat contact surface 37 of valve body 33, preventing or minimizing fluid flow through valve assembly 400. In an open configuration, valve body contact surface 69 of valve seat 68 does not contact valve seat contact surface 37 of valve body 33, thus allowing fluid flow through valve assembly 400.

As shown in FIG. 7, a weighted valve guide 450 comprises the valve guide 103 and one or more weights 50. The weight 50 can be added to and/or integral with the valve guide 103 as described herein. The weight 50 can be any suitable size, shape, and mass as described herein. As shown in FIGS. 6 and 7, the weight 50 comprises a first rod portion 55a, a second rod portion 55b, and a ring or wheel portion 57 (also referred to as a second guide ring or wheel coupled to the rod portion 55). A first end of first rod portion 55a is coupled to end 41 of valve guide 104. A first end of second rod portion 55b is coupled to a second end of first rod portion 55a. The wheel portion 57 is coupled proximate a second end of second rod portion 55b via a plurality of spokes or struts 59 extending radially from an outer surface of the second rod portion 55b to an inner surface of wheel portion 57. Similar to guide ring 44, the wheel portion 57 has an outer surface 61 extending circumferentially a radial distance from central axis 17 about equal to the radial distance from the central axis 17 to the inside surface of bore 67 such that the outer surface 61 further aids in the centralization of the valve guide 103 within the bore 67. As such, wheel portion 57 can be referred to as a second valve guide, wherein guide 103 is a first valve guide, and the first valve guide 103 is coupled to the second valve guide 57 via one or more rod portions 55 (e.g., 55a and 55b). When in a closed position as shown in FIG. 6, the wheel portion 57 can be positioned within bore 67 a distance from end 41 of valve guide 103 along central axis 17 that is about equal to a location where the radial distance from the central axis 17 to the inside surface of bore 67 begins to increase (e.g., at a location where the bore 67 begins to expand into a frustoconical cross-section along the central axis). Accordingly, when in a closed position as shown in FIG. 6, the wheel portion 57 is positioned proximate or adjacent an end of an expansion zone of bore 67 having a frustoconical cross-section along the central axis. An end cap or portion 58 can extend from wheel portion coaxial with central axis 17 on a side of wheel portion 57 opposite the second rod portion 55b.

The first rod portion 55a and the second rod portion may have the same or different dimensions. For example, (i) the first rod portion 55a may be longer in an axial direction than second rod portion 55b, or vice-versa; (ii) the second rod portion 55b may have a larger cross-sectional diameter than the first rod portion 55a, or vice versa; or (iii) both (i) and (ii), such that the center of gravity 102 of the horizontal guided valve 101 is moved to outside the valve body 33 (e.g., at a location along the central axis 17 within the first rod portion 55a or second rod portion 55b). For example, as shown in FIG. 6, the center of gravity 102 can be located in the second rod portion 55b (e.g., at about the mid-point of the length of the second rod portion 55b along the central axis 17). With reference to end 41 of valve guide 103, the center of gravity 102 of the horizontal guided valve 101 can be within the first ¼ length of the weight 50 along the central axis 17, alternatively within the second ¼ length of the weight 50 along the central axis 17, alternatively within the third ¼ length of the weight 50 along the central axis 17, alternatively within the fourth ¼ length of the weight 50 along the central axis 17, alternatively within the first ⅓ length of the first rod portion 55a along the central axis 17, alternatively within the second ⅓ length of the first rod portion 55a along the central axis 17, alternatively within the third ⅓ length of the first rod portion 55a along the central axis 17, alternatively within the first ⅓ length of the second rod portion 55b along the central axis 17, alternatively within the second ⅓ length of the second rod portion 55b along the central axis 17, or alternatively within the third ⅓ length of the second rod portion 55b along the central axis 17. In an aspect, with reference to end 41 of valve guide 103, the center of gravity 102 of the horizontal guided valve 101 can be external to the valve guide 103, internal to the weight 50 coupled to end 41 of valve guide 103, and spaced a distance along the central axis 17 of equal to or greater than about 0.25, 0.5, 0.75, 1, 1.25, 1.5, 1.75, 2, 2.25, 2.5, 2.75, 3, 3.5, 4, 4.5, 5, 6, 7, 8, 9, or 10 inches from end 41 of valve guide 103 (e.g., the center of gravity is located in the weight 50 at a distance along the central axis from end 41 of valve guide 103).

In embodiments, the horizontal guided valve 101 is designed with one or more cavities (alternatively referred to as offset cavities or balancing cavities) in a non-sealing surface thereof to move the center of gravity 102 in a direction away from the valve body 33 (e.g., to a location outside the valve body 33). Such cavities may be used in addition to or as an alternative to one or more weights 50 as described herein. A non-sealing surface refers to any surface that is not a sealing surface, which performs a function of sealing. Referring to FIGS. 5A and 6, valve body 33 comprises a first side 35 opposite (e.g., axially distal from) a second side 36. The first side 35 of valve body 33 comprises the valve seat contact surface 37 that contactss the valve body contact surface 69 of the valve seat 68 when the valve assembly 300/400 is in a closed position. Examples of a sealing surface include, but are not limited to, the valve seat contact surface 37 in FIGS. 5A and 6, and thus valve seat contact surface 37 should remain free from any cavities, holes, grooves, or the like that would break the seal formed by contact of the valve seat contact surface 37 with the valve body contact surface 69. Also, the cavities cannot create any flow path between the first side 35 and the second side 36 of the valve body 33, as such would interfere with the operation of the valve to provide a fluid tight seal when in a closed position. Therefore, the valve body 33 should remain free from any holes or through bores extending from the first side 33 continuously through the valve body 33 to the second side 36.

The cavities may be created (e.g., cut, drilled, milled, cast, etc.) in one or more components of the horizontal guided valve 101 (e.g., in the valve body 33 and/or the valve guide 103). The cavities can have any suitable size, shape, length, thickness, and cross-section effective to position a center of gravity of the valve assembly outside the valve body. The cavities may be any suitable length, thickness, cross-section, etc. to remove a sufficient mass to move the center of gravity 102 a distance (e.g., about 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10 or more inches) along the horizontal central axis 17 in a direction away from (distal from) the valve body 33 and toward the end 41 of valve guide 103. For example, the center of gravity 102 may be moved a distance along the horizontal central axis 17 in a direction away from the valve body 33 and toward the end 41 of valve guide 103 sufficient to position the center of gravity 102 inside of the valve body contact surface 69, the valve seat 68, and/or within a portion of the housing 65 having valve guide 103 disposed therein (e.g., within a bore 66 of housing 65).

Figure 8:
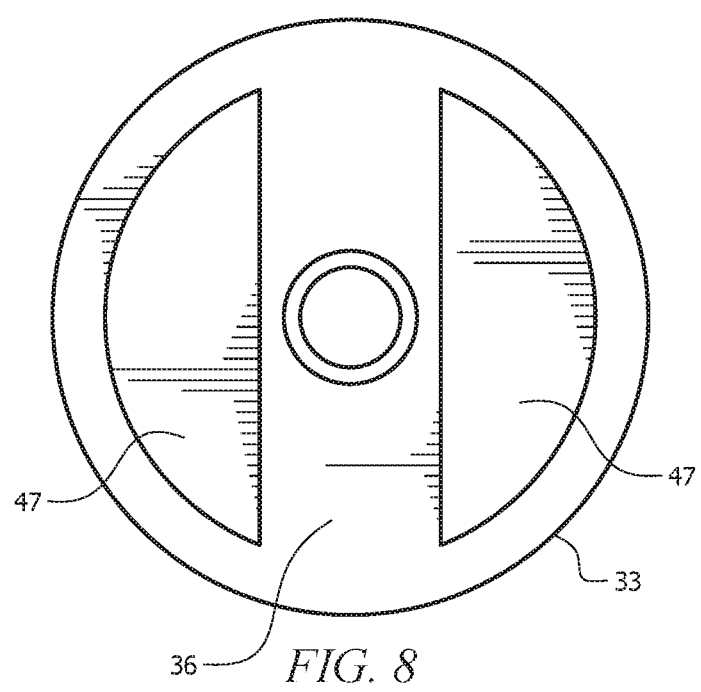
FIG. 8 is an end view of valve body 33 of FIGS. 5A, 6, or both.

In embodiments, the cavities can be created in the horizontal guided valve 101 to strategically position the center of gravity in an optimal location for uniform sealing and loading of the valve body 33 with the valve body contact surface 69. The cavities may serve to center and/or balance the guided valve 101 within the housing 65 (e.g., along or relative to central axis 17). The cavities can be in any suitable place except a sealing surface (e.g., valve seat contact surface 37 in FIGS. 5A and 6), for example in the valve body 33, in the valve guide 103, or both. Referring to FIG. 6, one or more cavities can comprise one or more hollow areas 63 within one or more wings 40 of valve guide 103. Referring to FIG. 7, one or more cavities can comprise one or more holes 64 within one or more wings 40 of valve guide 103. Referring to FIG. 8, a plurality of cavities 47 of any suitable size and shape (e.g., semicircular) can be in the valve body 33 (e.g., in second side 36) or in the valve guide 103 (e.g., hollow portions, voids, holes, etc. in the valve guide 103). The hollow areas 63, holes 64, and/or cavities 47 help to reduce mass at the end of the guide 103 proximate the valve body 33, thereby furthering contributing to movement of the center of gravity in a direction away from the valve body 33 and toward the wheel portion 57.

In embodiments, the horizontal guided valve 101 can be designed with one or more cavities in a non-sealing surface thereof and/or one or more weights placed to move the center of gravity 102 to outside the valve body 33, for example as shown in FIG. 6 with hollow areas 63 and weight 50 or FIG. 7 with holes 64 and weight 50.

Also disclosed herein is a pump fluid end 22 comprising a valve assembly 300 or 400 (300/400) of this disclosure, and a pump 10 comprising the pump fluid end 22. In embodiments, the pump fluid end 22 comprises the valve assembly 300/400 in an assembled configuration in which valve seat 68 is seated in valve seat housing 65, and valve body 33 is coupled to valve guide 103 via a valve stem 104. Valve spring 31 is positioned in bore 66 of valve seat housing 65.

In embodiments, a pump fluid end 22 of this disclosure comprises a suction valve assembly 56 and/or a discharge valve assembly 72 comprising the valve assembly 300/400. In embodiments wherein the discharge valve assembly 72 comprises a valve assembly 300/400, the valve seat 68 is a discharge valve seat, the valve body 33 is a discharge valve body, the valve spring 31 is a discharge valve spring, and the valve guide 103 is a discharge valve guide, and, when the discharge valve assembly 72 is in an assembled configuration, the discharge valve seat is seated in a discharge valve seat housing, the discharge valve body is coupled to the discharge valve guide via the valve stem, and the discharge valve spring is positioned in a bore of the discharge valve seat housing. In embodiments wherein the suction valve assembly 56 comprises a valve assembly 300/400, the valve seat 68 is a suction valve seat, the valve body 33 is a suction valve body, and the valve guide is a suction valve guide, and, when the suction valve assembly 56 is in an assembled configuration in which the suction valve seat is seated in a suction valve seat housing, the suction valve body is coupled to the suction valve guide via the valve stem, and the suction valve spring is positioned in a bore of the suction valve seat housing.

A pump fluid end 22 of this disclosure can be a cross-bore pump fluid end 22 or a concentric bore pump fluid end 22. In embodiments, the pump fluid end 22 comprising a valve assembly 300/400 of this disclosure as suction valve assembly 56, is a cross-bore pump fluid end 22 such as a T-bore pump fluid end (e.g., of the type shown in FIG. 2B and described in detail herein) comprising a fluid end body 8 comprising a T-bore pump chamber 28, a cylindrical reciprocating element bore 24, partially defined by cylinder walls 26, in which a reciprocating element 18 can reciprocate during operation of a pump comprising the pump fluid end 22, the reciprocating element 18, and a pump power end 12 (FIG. 3), and a cylindrical T-bore 25 comprising a suction valve assembly 56 and a discharge valve assembly 72.

In some such T-bore pump fluid end embodiments, suction valve assembly 56 comprises a valve assembly 300/400 of this disclosure. In this T-bore embodiment, suction valve seat housing 65 is positioned within an interior of fluid end body 8 and can comprise a part of an interior surface within T-bore 25 on a side of central axis 17 opposite that of discharge valve assembly 72 (e.g., a recess or channel within T-bore 25 located proximate the right side of T-bore 25). For example, in embodiments, the discharge valve assembly 72 is positioned coaxially above the suction valve assembly 56 within cross-bore 25. In embodiments, the suction valve assembly 56 comprising a valve assembly 300/400 of this disclosure is positioned within a reciprocating element bore 24 of the pump fluid end 22, wherein the reciprocating element bore 24 is perpendicular to the tee-bore 25.

In embodiments, the pump fluid end 22 is a concentric bore pump fluid end, such as depicted in FIG. 2A. The discharge valve assembly 72 comprises a valve assembly 300/400 of this disclosure, and is positioned at least partially within the reciprocating element bore 24 and is coaxially aligned with the suction valve assembly 56. In embodiments, the suction valve assembly 56 comprises a valve assembly 300/400 of this disclosure and a valve seat, and the reciprocating element 18 is at least partially hollow and has a front end 60 opposite a tail end 62 along a central axis of the reciprocating element bore 24, and the suction valve assembly 56 is coupled with the front end of the reciprocating element 18. The reciprocating element 18 can be a plunger. In embodiments, the horizontal valve assembly 300/400 has a central axis 17 that is about coaxial with a central axis of the reciprocating element bore 24.

Also disclosed herein is a pump 10 comprising a pump fluid end 22 of this disclosure. The pump of this disclosure comprises a pump power end 12 (e.g., as described with reference to FIG. 3, hereinabove) and a pump fluid end 22. The pump power end 12 is operable to reciprocate the reciprocating element 18 within a reciprocating element bore 24 of the pump fluid end 22. As described hereinabove, the pump fluid end 22 comprises: the reciprocating element 18, a suction valve assembly 56, and a discharge valve assembly 72. Reciprocating element 18 is disposed at least partially within the reciprocating element bore 24, and has a front end 60 opposite a tail end 62 along a central axis 17 of the reciprocating element bore 24. According to this disclosure, the suction valve assembly 56 of pump 10 is coupled with the front end 60 of the reciprocating element 18. In embodiments, the pump is a positive displacement pump comprising a valve assembly 300/400 of this disclosure, and the valve guide of the valve assembly 300/400 has a central axis that is about coaxial with a central axis of a plunger of the positive displacement pump.

In embodiments, the pump fluid end 22 of the pump 10 is a concentric bore pump fluid end 22, such as depicted in the embodiment of FIG. 2A, and the discharge valve assembly 72 is positioned at least partially within the reciprocating element bore 24 and is coaxially aligned with the suction valve assembly 56. In embodiments, the pump fluid end 22 of the pump 10 is a tee-bore pump fluid end 22, such as depicted in the embodiment of FIG. 2B, and the discharge valve assembly 72 is positioned within a tee-bore 25 of the pump fluid end 22, wherein the tee-bore 25 is perpendicular to the reciprocating element bore 24.

A pump 10 of this disclosure can be a multiplex pump comprising a plurality of reciprocating assemblies (e.g., reciprocating elements 18, and a corresponding plurality of reciprocating element bores 24, suction valve assemblies 56, and discharge valve assemblies 72). The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five.

The pump 10 can be an oilfield services pump configured to pump a wellbore servicing fluid. Examples of wellbore servicing fluids suitable include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, diverter fluids, gelation fluids, polymeric fluids, aqueous fluids, oleaginous fluids, etc. The pump 10 can be used in oilfield and/or well servicing operations which include, but are not limited to, drilling operations, fracturing operations, perforating operations, fluid loss operations, primary cementing operations, secondary or remedial cementing operations, or any combination of operations thereof.

A pump with a horizontal guided valve assembly (hereinafter also referred to as a first valve assembly) that is not a valve assembly of this disclosure can be serviced to become a pump of this disclosure (hereinafter also referred to as a serviced pump). The first valve assembly can be changed (e.g., replaced, retrofitted) into a valve assemble of this disclosure (hereinafter also referred to as a second valve assembly). The second valve assembly can be a new valve assembly from the first valve assembly or a retrofit of the first valve assembly. For example, the first valve assembly can be a valve assembly 100 as in FIG. 4 having a center of gravity 102 in the valve body 33. The second valve assembly can be any of the valve assembly of this disclosure (e.g., a valve assembly 300/400 in any of FIGS. 5-8). The second valve assembly can be a retrofit of the first valve assembly. The retrofit can involve adding weights and/or removing a portion of mass from the first valve assembly. The center of gravity can be moved by adding mass to the valve assembly (e.g., in a valve stem and/or valve guide of the valve assembly), and/or by removing a portion of mass from the valve assembly (e.g., in a valve body and/or valve guide of the valve assembly).

By servicing the pump, the center of gravity of a horizontal guided valve assembly of the pump can be moved along a central axis of the valve assembly to offset gravitational tilt of the valve assembly along the central axis during opening and/or closing of the valve. The center of gravity can be moved by removing a portion of mass from the valve assembly (e.g., in a valve guide and/or a valve body of the valve assembly), by adding mass to the valve assembly (e.g., in a valve stem and/or valve guide of the valve assembly), or both. Referring to FIG. 5A, shifting the center of gravity 102 (for example to a location within the valve body contact surface 69, the valve seat 68, and/or bore 66 of housing 65) can reduce the tendency of horizontal guided valves to tilt at opening due to gravity, especially when the center of gravity is outside the valve body contact surface 69. Upon closing and subsequent high pressure sealing, the balanced, non-tilted valve of the present disclosure (e.g., FIGS. 5-8) returns on-center along central axis 17, thereby avoiding non-uniform wear on the valve and undesired angular loading on the valve stem 104 and/or valve guide 103 as shown by angle 32 of FIG. 4.

A method of servicing a pump can comprise: changing (e.g., adjusting or moving) a center of gravity on a valve assembly in the pump, wherein the valve assembly is a horizontal guided valve assembly. The center of gravity of the first valve assembly can be changed by various methods. The first valve assembly can stay in or be taken out of the pump 10 while the center of gravity is being changed. The first valve assembly can be accessed from any of the one or more access ports of the pump 10, for instance, a front access port 30A and/or a top access port 30B.

In embodiments, the first valve assembly is replaced by a second valve assembly that has a different center of gravity. The method can further comprise: removing a first horizontal guided valve assembly from the pump, wherein the first valve assembly comprises a valve body and a valve guide and wherein the first valve assembly has a center of gravity proximate (e.g., located within or internal to) the valve body; and installing a second horizontal guided valve assembly in the pump, wherein the second valve assembly comprises a valve body and a valve guide and wherein the second valve assembly has a center of gravity located outside or external to the valve body (e.g, proximate (e.g., located within or internal to) the valve guide).

In embodiments, the second valve assemblies can comprise any parts, as long as the second valve assembly has a center of gravity that is moved a distance along a horizontal central axis of the second valve assembly in a direction away from the valve body in comparison to the center of gravity of the first valve assembly. The method can further comprise: removing a first horizontal guided valve assembly from the pump, wherein the first valve assembly comprises a valve guide and a valve body and wherein the first valve assembly has a center of gravity proximate (e.g., located within or internal to) the valve body; and installing a second horizontal guided valve assembly in the pump, wherein the second valve assembly has a center of gravity that is moved a distance along a horizontal central axis of the second valve assembly in a direction away from the valve body in comparison to the center of gravity of the first valve assembly.

In embodiments, the first and/or the second valve assemblies can comprise any parts, as long as the second valve assembly has a center of gravity that is moved a distance along a horizontal central axis of the second valve assembly in a direction away from the valve body in comparison to the center of gravity of the first valve assembly. The method can further comprise: removing a first horizontal guided valve assembly from the pump, wherein the first valve assembly has a center of gravity; and installing a second horizontal guided valve assembly in the pump, wherein the second valve assembly has a center of gravity that is moved a distance along a horizontal central axis of the second valve assembly in a direction away from the valve body in comparison to the center of gravity of the first valve assembly.

In the methods disclosed hereinabove, the second valve assembly can be the first valve assembly further comprising one or more weights added (e.g., coupled, affixed) thereto as described herein with reference to FIGS. 5-7. For instance, the first valve assembly can be the valve assembly 100 in FIG. 4, and the second valve assembly can be the horizontal valve assembly 300 in FIG. 5A, which has the weight 50 added thereto in comparison with the first valve assembly 100 of FIG. 4. Herein the weight 50 comprises a rod portion 55. In some other embodiments, the second valve assembly can be the valve assembly 400 in FIG. 6, which has the weight 50 added thereto in comparison with the first valve assembly 100 of FIG. 4. The weight 50 can comprise one or more weights, for example, rod portions 55a and 55b and a wheel portion 57 connected to the rod portion 55 as shown in FIG. 6 and described herein. The one or more weights can be coupled to and/or integral with a valve guide of the valve assembly as described herein.

The second valve assembly can be the first valve assembly with a portion of mass removed from the first valve assembly. The portion of mass removed can be in the valve body as shown in FIG. 8 and/or in the valve guide as shown by hollow areas 63 of FIG. 6 and/or holes 64 of FIG. 7, and can be removed (e.g., cut, drilled) by any suitable methods. The removal of the portion of mass can create the cavities of this disclosure. The removal of the portion of mass can shift the center of gravity away from the valve body as described herein.

In the methods of this disclosure, the pump that is serviced can be an oil-field services positive displacement pump. The method of servicing such a pump comprises (i) adding one or more weights to a horizontal guided valve assembly of an oil-field services positive displacement pump to change a center of gravity of the valve assembly; (ii) removing a portion of mass from a horizontal guided valve assembly of an oil-field services positive displacement pump to change a center of gravity of the valve assembly; or (iii) both (i) and (ii). The portion of mass removed can be in a valve body and/or a valve guide of the valve assembly prior to the removing.

In embodiments, the methods as disclosed hereinabove further comprise operating the serviced pump to place a wellbore servicing fluid in a wellbore. The method of using the pump in servicing a wellbore will be described hereinbelow.

Figure 9:
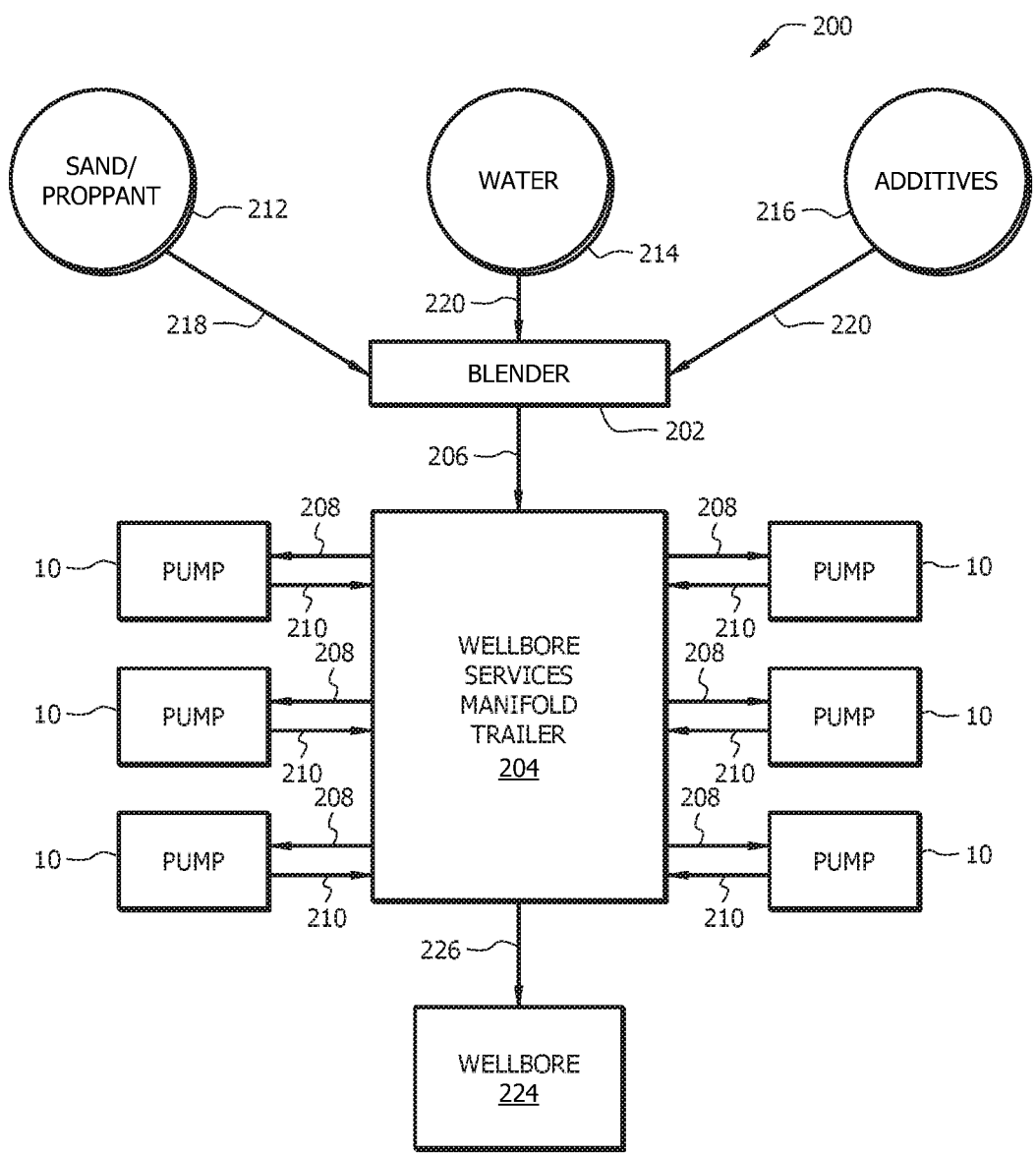
FIG. 9 is a schematic representation of an embodiment of a wellbore servicing system.

Disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 9, which is a schematic representation of an embodiment of a wellbore servicing system 200, according to embodiments of this disclosure.

A method of servicing a wellbore 224 according to this disclosure comprises fluidly coupling a pump 10 of this disclosure to a source of a wellbore servicing fluid and to the wellbore, and communicating wellbore servicing fluid into the wellbore via the pump. The method can further comprise discontinuing the communicating of the wellbore servicing fluid into the wellbore via the pump, subjecting the pump to maintenance to provide a maintained pump, and communicating the or another wellbore servicing fluid into the wellbore via the maintained pump. Subjecting the pump to maintenance can comprise servicing the pump 10, as described hereinabove. During operation of a pump 10 of this disclosure, central axis 17A of the valve guide is coincident with central axis 17B of the valve body 33 and central axis 17 of pump fluid end 22.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, diverter fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gravel pack fluid, a diverter fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. When a horizontal guided valve is not properly balanced on the guiding surface, the valve will tilt upon opening. Due to the speed at which a valve returns during pressure sealing, the valve may not have adequate time to re-center causing the valve to load at an angle. This can cause the valve stem to shear or fatigue and fail and dramatically reduce the life of the valve. The disclosed valve assembly can avoid the tendency to tilt at opening due to gravity by strategically having the center of gravity in an optimal location for uniform sealing and loading. By moving the center of gravity of the valve (e.g., to a location proximate a guiding surface), upon opening and closing, the central axis of the valve can remain parallel to the flow path, allowing for uniform loading of the valve stem. Therefore, the present design increases valve life, lowers total component cost, provides decreased maintenance spend, and decreases non-productive (i.e., down) time on location.

ADDITIONAL DISCLOSURE

The following enumerated aspects of the present disclosure are provided as non-limiting examples.

A first embodiment, which is a horizontal valve assembly comprising a valve guide, a valve body, and a valve stem connecting the valve body to the valve guide, wherein the valve assembly has a center of gravity outside the valve body.

A second embodiment, which is the valve assembly of the first embodiment wherein the valve assembly has a center of gravity located in the valve stem or valve guide.

A third embodiment, which is the valve assembly of the first or the second embodiment wherein the center of gravity is located proximate an end of the valve guide opposite from the valve body.

A fourth embodiment, which is the valve assembly of the third embodiment wherein the center of gravity is located equal to or less than about 3 inches from and end of the valve guide opposite from the valve body.

A fifth embodiment, which is the valve assembly of any of the first through the fourth embodiments wherein the valve guide comprises a first guide wheel.

A sixth embodiment, which is the valve assembly of any of the first through the fifth embodiments further comprising a weight coupled to the valve guide.

A seventh embodiment, which is the valve assembly of the sixth embodiment wherein the weight comprises a rod coupled to an end of the valve guide opposite the valve body.

An eighth embodiment, which is the valve assembly of the seventh embodiment wherein the center of gravity is located within the rod.

A ninth embodiment, which is the valve assembly of the seventh or the eighth embodiment further comprising a second guide wheel coupled proximate an end of the rod opposite the valve guide.

A tenth embodiment, which is the valve assembly of any of the first through the ninth embodiments wherein the valve body has one or more cavities in a non-sealing surface thereof.

An eleventh embodiment, which is the valve assembly of the first through the tenth embodiments wherein the valve guide has one or more cavities therein.

A twelfth embodiment, which is a pump fluid end comprising a reciprocating element disposed at least partially within a reciprocating element bore of the pump fluid end; a discharge valve assembly; and a suction valve assembly, wherein the discharge valve assembly and/or the suction valve assembly comprises a horizontal valve assembly of any of claims 1-11 and a valve seat.

A thirteenth embodiment, which is the pump fluid end of the twelfth embodiment wherein the pump fluid end is a concentric bore pump fluid end or a cross-bore pump fluid end.

A fourteenth embodiment, which is the pump fluid end of the thirteenth embodiment wherein the pump fluid end is a T-bore pump fluid end, wherein the discharge valve assembly is positioned within a tee-bore of the pump fluid end, and wherein the tee-bore is perpendicular to the reciprocating element bore.

A fifteenth embodiment, which is the pump fluid end of the thirteenth embodiment wherein the pump fluid end is a concentric bore pump fluid end, wherein the discharge valve assembly is positioned at least partially within the reciprocating element bore and is coaxially aligned with the suction valve assembly.

A sixteenth embodiment, which is the pump fluid end of any of the twelfth through the fifteenth embodiments wherein the suction valve assembly comprises a valve assembly of any of claims 1-11 and a valve seat, and wherein the reciprocating element is at least partially hollow and has a front end opposite a tail end along a central axis of the reciprocating element bore, and the suction valve assembly is coupled with the front end of the reciprocating element.

A seventeenth embodiment, which is the pump fluid end of any of the twelfth through the sixteenth embodiments wherein the reciprocating element is a plunger.

An eighteenth embodiment, which is the pump fluid end of any of the twelfth through the seventeenth embodiments wherein the horizontal valve assembly has a central axis that is about coaxial with a central axis of the reciprocating element bore.

A nineteenth embodiment, which is a pump comprising the pump fluid end of any of the twelfth through the eighteenth embodiments.

A twentieth embodiment, which is the pump of the nineteenth embodiment wherein the pump is a positive displacement pump.

A twenty-first embodiment, which is the pump of any of the nineteenth and the twentieth embodiments wherein the pump is an oilfield services pump configured to pump a wellbore servicing fluid such as a fracturing fluid.

A twenty-second embodiment, which is the pump of any of the nineteenth through the twenty-first embodiments wherein the pump further comprises a pump power end.

A twenty-third embodiment, which is the pump of any of the nineteenth through the twenty-second embodiments, is a multiplex pump comprising a plurality of reciprocating elements, and a corresponding plurality of reciprocating element bores, suction valve assemblies, and discharge valve assemblies.

A twenty-fourth embodiment, which is a method comprising moving a center of gravity on a valve assembly in a pump, wherein the valve assembly is a horizontal guided valve assembly having a horizontal central axis and wherein the center of gravity is moved a distance along the central axis in a direction away from the valve body.

A twenty-fifth embodiment, which is a method comprising removing a first horizontal guided valve assembly from the pump, wherein the first valve assembly comprises a valve body and a valve guide and wherein the first valve assembly has a center of gravity proximate (e.g., located within) the valve body, and installing a second horizontal guided valve assembly of any of the first through the eleventh embodiments in the pump, wherein the second valve assembly comprises a valve body and a valve guide and wherein the second valve assembly has a center of gravity proximate (e.g., located within) the valve guide.

A twenty-sixth embodiment, which is a method comprising removing a first horizontal guided valve assembly from the pump, wherein the first valve assembly comprises a valve guide and a valve body and wherein the first valve assembly has a center of gravity proximate (e.g., located within) the valve body, and installing a second horizontal guided valve assembly of any of claims 1-11 in the pump, wherein the second valve assembly has a center of gravity that is moved a distance along a horizontal central axis of the second valve assembly in comparison to the center of gravity of the first valve assembly.

A twenty-seventh embodiment, which is a method comprising removing a first horizontal guided valve assembly from the pump, wherein the first valve assembly has a center of gravity, and installing a second horizontal guided valve assembly of any of the first through the eleventh embodiments in the pump, wherein the second valve assembly has a center of gravity that is moved a distance along a horizontal central axis of the second valve assembly in comparison to the center of gravity of the first valve assembly.

A twenty-eighth embodiment, which is the method of any of the twenty-fifth through the twenty-seventh embodiments wherein the second valve assembly is the first valve assembly further comprising one or more weights added thereto.

A twenty-ninth embodiment, which is the method of any of the twenty-fifth through the twenty-seventh embodiments wherein the second valve assembly is the first valve assembly with a portion of mass removed from the first valve assembly.

A thirtieth embodiment, which is the method of the twenty-eighth or the twenty-ninth embodiment wherein the second valve assembly is a retrofit of the first valve assembly.

A thirty-first embodiment, which is a method comprising adding one or more weights to a horizontal guided valve assembly of an oil-field services positive displacement pump to change a center of gravity of the valve assembly.

A thirty-second embodiment, which is the method of the thirty-first embodiment wherein the one or more weights are coupled to a valve guide of the valve assembly.

A thirty-third embodiment, which is a method comprising removing a portion of mass from a horizontal guided valve assembly of an oil-field services positive displacement pump to change a center of gravity of the valve assembly.

A thirty-fourth embodiment, which is the method of the thirty-third wherein the portion of mass is in a valve body and/or valve guide of the valve assembly prior to the removing.

A thirty-fifth embodiment, which is a method comprising moving a center of gravity of a horizontal guided valve assembly along a central axis of the valve assembly to offset gravitational tilt of the valve assembly along the central axis during opening and/or closing of the valve.

A thirty-sixth embodiment, which is the method of the thirty-fifth embodiment wherein the center of gravity is moved by removing a portion of mass from the valve assembly (e.g., from a valve body and/or valve guide of the valve assembly), by adding mass to the valve assembly (e.g., coupled to a valve guide of the valve assembly), or both.

A thirty-seventh embodiment, which is a method comprising pumping a wellbore servicing fluid such as a fracturing fluid with the pump of any of the nineteenth through the twenty-third embodiments.

A thirty-eighth embodiment, which is a method of servicing a wellbore, the method comprising fluidly coupling a pump to a source of a wellbore servicing fluid and to the wellbore, and communicating wellbore servicing fluid into the wellbore via the pump, wherein the pump comprises a pump fluid end and a pump power end, wherein the pump fluid end comprises a reciprocating element disposed at least partially within a reciprocating element bore of the pump fluid end, a discharge valve assembly, and a suction valve assembly, wherein the discharge valve assembly and/or the suction valve assembly comprises a valve seat and a horizontal valve assembly, wherein the horizontal valve assembly comprises a valve guide, a valve body, and a valve stem connecting the valve body to the valve guide, wherein the horizontal valve assembly has a center of gravity outside the valve body, and wherein the pump power end is operable to reciprocate the reciprocating element within the reciprocating element bore of the pump fluid end.

A thirty-ninth embodiment, which is the method of any of the twenty-fourth through the thirty-sixth embodiments wherein the valve assembly is housed within a fluid end of a positive displacement pump and the method further comprises operating the pump to place a wellbore servicing fluid in a wellbore.

A fortieth embodiment, which is the method of any of the thirty-eighth and the thirty-ninth embodiments wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

A forty-first embodiment, which is a horizontal valve assembly comprising a valve guide and one or more weights coupled to and/or integral with the valve guide.

A forty-second embodiment, which is the valve assembly of the forty-first embodiment wherein the valve guide has a central axis that is about coaxial with a central axis of a plunger of a positive displacement pump comprising the valve assembly.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A pump fluid end comprising: a reciprocating element disposed at least partially within a horizontal reciprocating element bore of the pump fluid end having a central horizontal axis; a discharge valve assembly; and a suction valve assembly,
   wherein the suction valve assembly is a horizontal valve assembly comprising a valve guide, a valve body, and a valve stem connecting the valve body to the valve guide, wherein the horizontal valve assembly has a center of gravity outside the valve body and wherein the suction valve assembly is coaxial with the central horizontal axis of the horizontal reciprocating element bore.

2. The fluid end of claim 1, wherein the valve assembly has a center of gravity located in the valve stem or valve guide.

3. The fluid end of claim 2, wherein the center of gravity is located proximate an end of the valve guide opposite from the valve body.

4. The fluid end of claim 3, wherein the center of gravity is located equal to or less than about 3 inches from and end of the valve guide opposite from the valve body.

5. The fluid end of claim 1, wherein the valve guide comprises a first guide wheel.

6. The fluid end of claim 1, further comprising a weight coupled to the valve guide.

7. The fluid end of claim 6, wherein the weight comprises a rod coupled to an end of the valve guide opposite the valve body.

8. The fluid end of claim 7, wherein the center of gravity is located within the rod.

9. The fluid end of claim 7, further comprising a second guide wheel coupled proximate an end of the rod opposite the valve guide.

10. The fluid end of claim 1, wherein the valve body has one or more cavities in a non-sealing surface thereof.

11. The fluid end of claim 1, wherein the valve guide has one or more cavities therein.

12. The pump fluid end of claim 1, wherein the pump fluid end is a concentric bore pump fluid end, wherein the discharge valve assembly is positioned at least partially within the reciprocating element bore and is coaxially aligned with the suction valve assembly.

13. The pump fluid end of any of claim 12, wherein the reciprocating element is at least partially hollow and has a front end opposite a tail end along the central horizontal axis of the reciprocating element bore, and the suction valve assembly is coupled with the front end of the reciprocating element.

14. A pump comprising the pump fluid end of claim 1.

15. The pump fluid end of claim 1, wherein the reciprocating element is at least partially hollow and has a front end opposite a tail end along the central horizontal axis of the reciprocating element bore, and the suction valve assembly is coupled with the front end of the reciprocating element.

16. A method comprising:
    removing a first horizontal guided valve assembly from a pump fluid end having a horizontal reciprocating element bore having a central horizontal axis, wherein the first valve assembly comprises a valve guide and a valve body and wherein the first valve assembly has a center of gravity proximate the valve body; and
    installing a second horizontal guided valve assembly in the pump fluid end, wherein the second valve assembly comprises a valve guide, a valve body, and a valve stem connecting the valve body to the valve guide and has a center of gravity that is moved a distance along a horizontal central axis of the second valve assembly in comparison to the center of gravity of the first valve assembly, and
    wherein the second horizontal guided valve assembly is coaxial with the central horizontal axis of the horizontal reciprocating element bore.

17. The method of claim 16 wherein the second valve assembly is the first valve assembly further comprising one or more weights added thereto, wherein the second valve assembly is the first valve assembly with a portion of mass removed from the first valve assembly, or both.

* * * * *